United States Patent
Zhang et al.

(10) Patent No.: US 9,113,089 B2
(45) Date of Patent: Aug. 18, 2015

(54) NOISE-CONSTRAINED TONE CURVE GENERATION

(75) Inventors: Xuemei Zhang, Mountain View, CA (US); Steven D. Hordley, Los Gatos, CA (US); Graham Finlayson, Norwich (GB)

(73) Assignee: Apple Inc., Cupertino, CA (US)

( * ) Notice: Subject to any disclaimer, the term of this patent is extended or adjusted under 35 U.S.C. 154(b) by 480 days.

(21) Appl. No.: 13/490,311

(22) Filed: Jun. 6, 2012

(65) Prior Publication Data

US 2013/0329093 A1 Dec. 12, 2013

(51) Int. Cl.
*G06K 9/48* (2006.01)
*H04N 5/235* (2006.01)

(52) U.S. Cl.
CPC ................... *H04N 5/2355* (2013.01)

(58) Field of Classification Search
None
See application file for complete search history.

(56) References Cited

U.S. PATENT DOCUMENTS

| | | | |
|---|---|---|---|
| 4,731,671 A * | 3/1988 | Alkofer | 382/274 |
| 6,717,698 B1 * | 4/2004 | Lee | 358/1.9 |
| 7,506,135 B1 * | 3/2009 | Mimar | 712/22 |
| 2003/0021488 A1 * | 1/2003 | Shaw et al. | 382/260 |
| 2004/0057632 A1 * | 3/2004 | Gindele | 382/274 |
| 2006/0182361 A1 * | 8/2006 | Ptucha et al. | 382/254 |
| 2007/0014470 A1 * | 1/2007 | Sloan | 382/162 |
| 2007/0252834 A1 * | 11/2007 | Fay | 345/428 |
| 2009/0100339 A1 * | 4/2009 | Wharton-Ali et al. | 715/720 |
| 2010/0157078 A1 | 6/2010 | Attanossov | |
| 2010/0226547 A1 | 9/2010 | Criminisi | |
| 2012/0170842 A1 | 7/2012 | Liu | |
| 2012/0188247 A1 | 7/2012 | Cheung | |
| 2013/0329093 A1 * | 12/2013 | Zhang et al. | 348/241 |
| 2014/0247870 A1 * | 9/2014 | Mertens | 375/240.08 |

OTHER PUBLICATIONS

"FAQ—HDR Images for Photography." http//:www.hdrsoft.com/resources/dri.html Accessed Mar. 16, 2012. pp. 1-8.
Durand, Fredo and Julie Doresy. "Fast Bilateral Filtering for the Display of High-Dynamic-Range Images." http//:people.csail.mit.edu/fredo/PUBLI/Siggraph2002/ Accessed Mar. 16, 2012. pp. 1-7.
Zhang, Xuemei and Steven Hordley. "Noise-Constrained Tone Curve Generation." Apple inc.—White Paper. pp. 3, Mar. 13, 2012.

* cited by examiner

*Primary Examiner* — Tahmina Ansari
(74) *Attorney, Agent, or Firm* — Blank Rome LLP

(57) ABSTRACT

Methods to generate, and devices to use, an adaptive tone curve generation operation are disclosed. Tone curves so generated have been found to produce stable tone mapping in a wide range of operational environments, including during multi-exposure fused images (e.g., during high dynamic range image fusion). In general, techniques are disclosed that use a content-load histogram in combination with image capture device noise information to adaptively bound a tone curve's slope and, therefore, the resulting tone curve. As used here, a content-load histogram is a histogram that captures spatial, color or other information carried by an image's pixels at various gray levels.

44 Claims, 9 Drawing Sheets

NOISE-CONSTRAINED TONE CURVE GENERATION

BACKGROUND

This disclosure relates generally to the field of image processing and, more particularly, to various techniques to generate noise-constrained tone curves for use in real-time image processing.

Tone mapping is the process of remapping gray levels from a first or input image to different levels in a second or output image. Tone mapping is generally used to adjust the input image to more closely match the visual appearance anticipated by the human eye on a particular output device, and/or to better preserve image information when mapping an input image to a smaller output dynamic range. Global tone mapping refers to the situation where there is a single tone curve that maps input gray levels to output gray levels. Local tone mapping refers to the case where a single gray level in the input image maps to multiple gray levels in the output image depending on the spatial location and configuration of the input image. Tone mapping is used in almost all image processing pipelines, but is of particular importance when rendering high dynamic range images for a limited dynamic range output device (e.g., created for example by fusing multiple exposures). Illustrative devices having a limited output dynamic range include most consumer desktop and portable displays.

SUMMARY

In general, the inventive concept provides methods, systems and computer readable media to generate noise-constrained tone curves. In one embodiment, each pixel in an image obtained from an image capture device may be evaluated to determine its contribution to a content-load histogram (e.g., a content-load measure). For example, each pixel may be used to identify a bin in the content-load histogram, where after the pixel (or pixel neighborhood) may be evaluated to identify spatial information corresponding to the pixel. In one embodiment, the spatial information may be generated in real-time as part of the pixel evaluation procedure. In another embodiment, the spatial information may be obtained from a separate image. However obtained, the information may be used to update the identified content-load histogram's bin. Once an image's pixels have been evaluated, the resulting content-load histogram may be adjusted based on the image capture device's noise characteristics. In particular, upper and lower bounds for the content-load histogram may be established. The adjusted content-load histogram may then be use to generate a noise-constrained tone curve which may be used to map an input image to an output image.

In another embodiment, each content-load measure may be adjusted or weighted to account for the presence of one or more anchor pixels. In one such embodiment, a first anchor pixel may be selected and each pixel in the input image evaluated in terms of that anchor pixel. For example, each pixel's content-load measure may be adjusted in accordance with a specified functional relationship between itself and the current anchor pixel. In one embodiment, the specified functional relationship may be based on the distance between the two pixels. At one extreme, every input image pixel may be selected as an anchor pixel. Alternatively, a specified subset of image pixels may be selected to be anchor pixels. Once a content-load histogram has been generated for each anchor pixel, the histograms may be adjusted to account for the image capture devices noise characteristics. Once adjusted, each content-load histogram may be converted to a noise-constrained tone curve and used to generate an output image.

DETAILED DESCRIPTION

This disclosure pertains to systems, methods, and computer readable media to generate noise-constrained tone curves. The disclosed tone curves have been found to produce stable tone mapping for high dynamic range images produced through multi-exposure fusion (e.g., during high dynamic range image fusion). In general, techniques are disclosed that use a content-load histogram in combination with an image capture device's noise information to adaptively bound the content-load histogram's slope and, therefore, the resulting tone curve. As used herein, a content-load histogram is a histogram where each bin corresponds to a value, or range of values, that pixels in an input image may assume (e.g., luma or color intensity), and where each bin's value represents the amount of spatial, color or other information carried by the input image's pixels at the bin's corresponding value or range of values (e.g., luma or color intensity).

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

Figure 1:
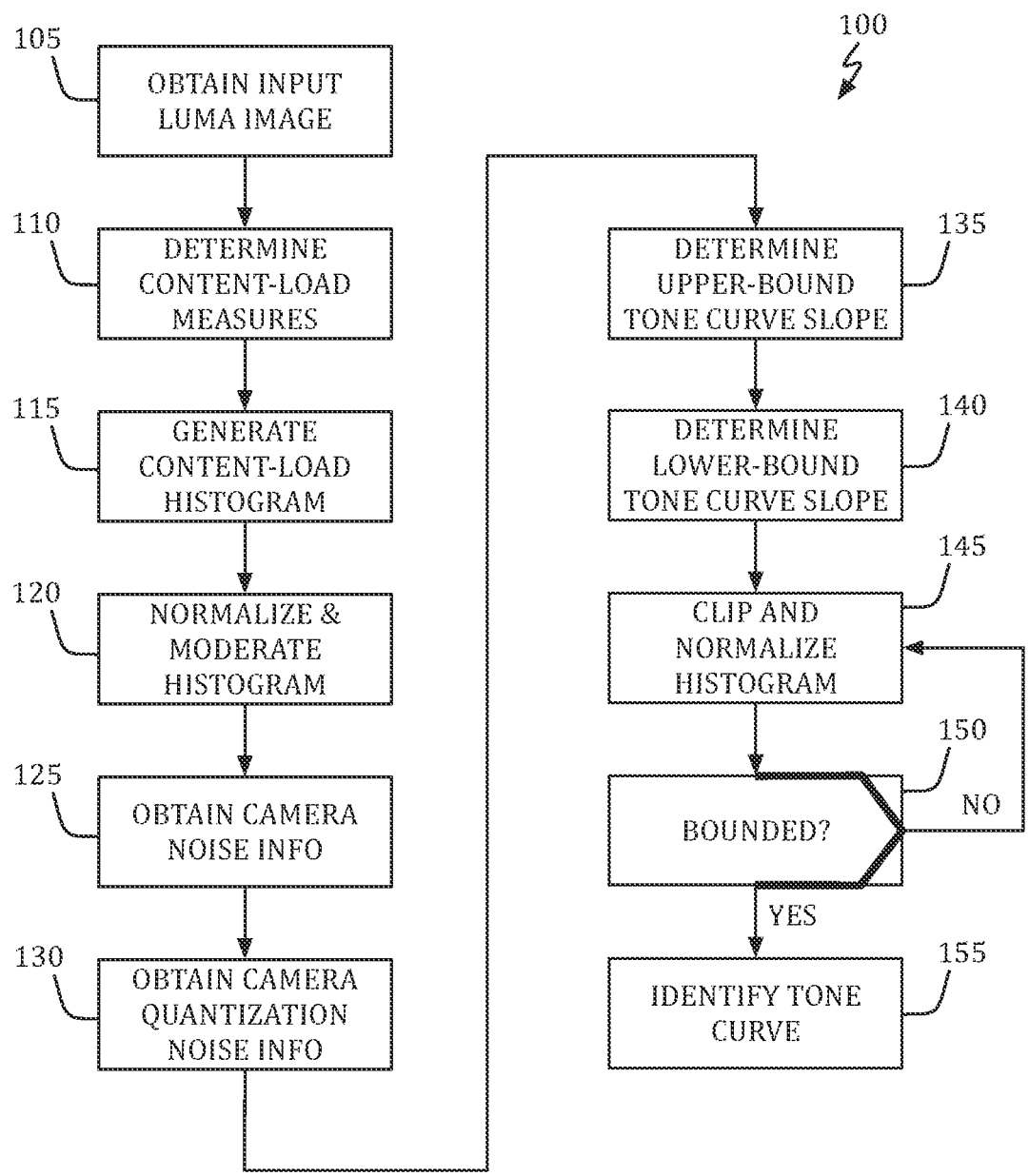
FIG. 1 shows, in block diagram form, an adaptive noise-constrained tone curve generation operation in accordance with one embodiment.

Referring to FIG. 1, noise-constrained tone curve generation operation 100 in accordance with one embodiment begins by obtaining the luminance (or luma) image of a full-color input image (block 105). In one embodiment, white balance and color correction may be performed prior to beginning operation 100. Image preprocessing (e.g., white balance and color correction) may, for example, be performed by a conventional processor, a specialized graphics processor, a custom integrated sensor package (ISP), or a combination of these elements. Next, for each pixel location in the input luma image, a content-load measure may be calculated (block 110). In one embodiment, the content-load measure may correspond to the edge strength at the pixel's location if an edge strength map of the luma image were calculated. In another embodiment, the content-load information may represent the dynamic range in an area around each input image pixel. In still another embodiment, the content-load measures may represent color information such a color saturation or hue angle information for applications where finer tone discrimination is desired for gray levels of more saturated colors, or for a specific hue (as provided, for example, in some color appearance specifications or other color appearance models). More broadly, any content-load measure that captures information of the type deemed appropriate for the intended application may be used.

Together the luma values and content-load values at each pixel in the image may be used to generate a content-load histogram (block 115). A content-load histogram may be thought of as a histogram in which each bin corresponds to a gray level in a luma image, and each bin's value represents the amount of spatial or color information carried by the pixels with the corresponding gray level. As such, it will be understood that the content-load histogram generally has a number of bins equal to the number of gray levels in the luma image. Sometimes, however, the content-load histogram's bin size can be different from one digital count, resulting in a histogram having a different size.

Figure 2:
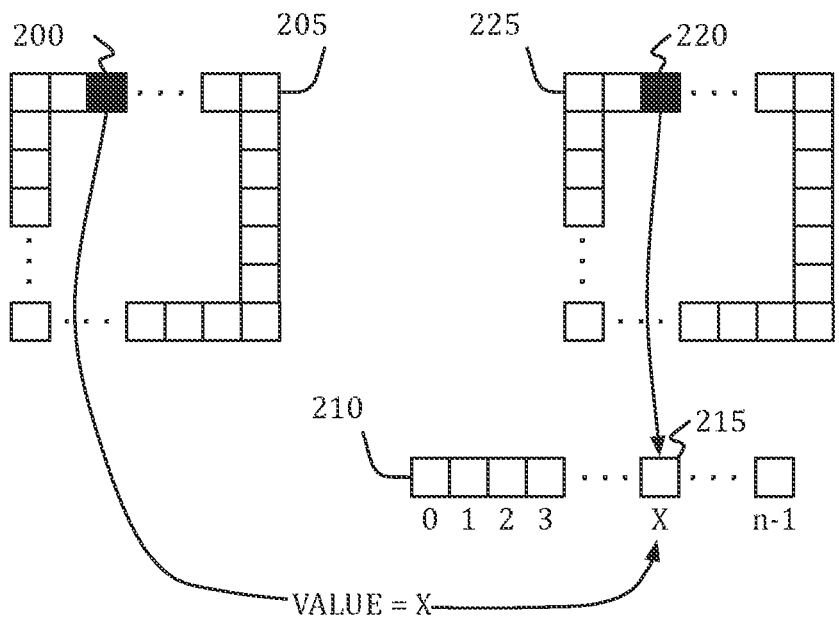
FIG. 2 illustrates a content-load histogram update operation in accordance with one embodiment.
Figure 3:
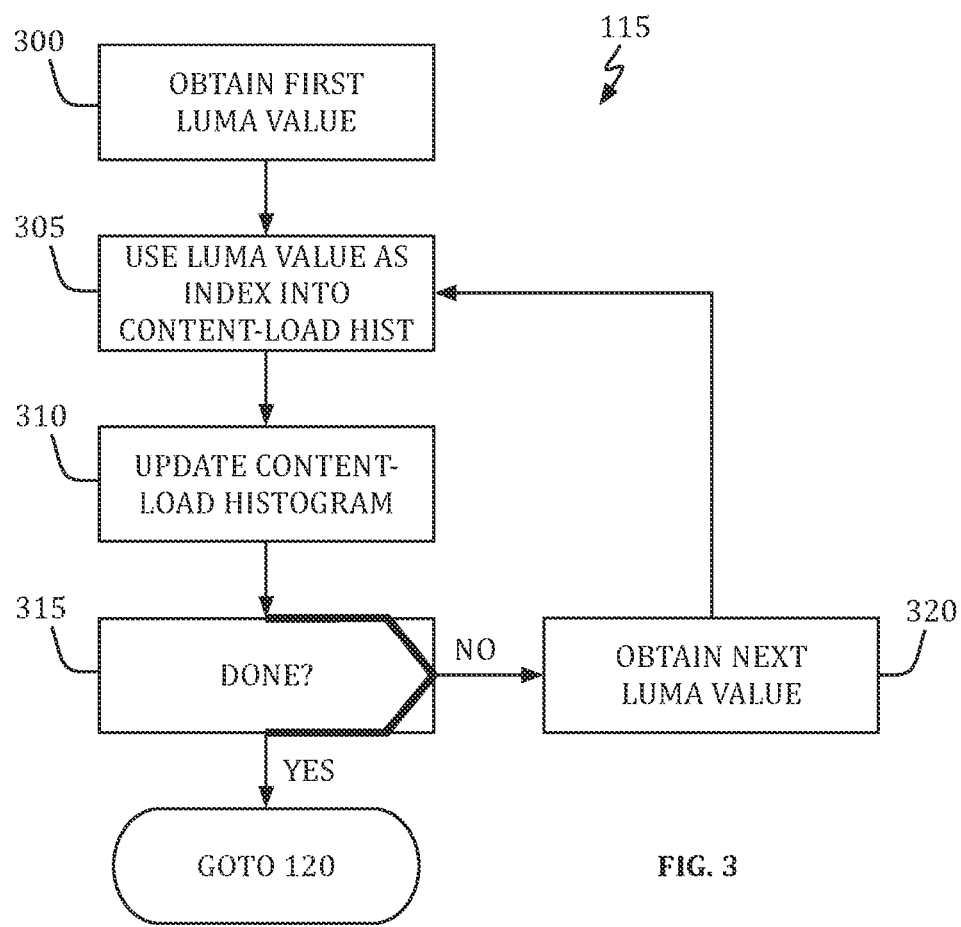
FIG. 3 shows, in flowchart form, a content-load histogram generation operation in accordance with one embodiment.

One illustrative method to generate a content-load histogram is shown in FIGS. 2 and 3. To begin, a first pixel 200 from input luma image 205 may be selected (block 300). The value of pixel 200 may be used as an index into content-load histogram 210 (block 305). The identified content-load histogram bin 215 may then be updated with the value of the selected luma pixel's corresponding pixel 220 from spatial image 225 (block 310). The act of updating may be expressed as:

$$H[i] = Y[i] \otimes S[i], \qquad \text{EQ. 1}$$

where H[i] represents the i-th bin of the content-load histogram, Y[i] represents the i-th element/pixel of the input luma image, S[i] represents the i-th element/pixel of the spatial image, and '$\otimes$' represents a generic composition operator. In one embodiment, for example, the composition operator may represent a sum operator in which each spatial image value is added to that content-load histogram bin at the corresponding luma image's gray level (i.e., value). In another embodiment, the composition operator may yield a mean or standard deviation value. Substantially any function (linear or nonlinear) may be used that captures or characterizes the amount of information carried by the selected spatial image at each gray level present in the input luma image. Once the first luma pixel has been processed, a check can be made to determine if additional luma pixels remain (block 315). If the luma image has not been completely processed in accordance with blocks 305-310 (the "NO" prong of block 315), the next pixel from the luma image may be selected (block 320), where after operation 115 continues at block 305. If all pixels in the input luma image have been processed (the "YES" prong of block 315), operations continue at block 120 of FIG. 1.

While spatial content image 225 may comprise a separate buffered image as suggested by FIG. 2, in practice it may be that spatial information for each selected input (luma) image pixel may generated in real-time. Implementations using this approach, would generate the necessary spatial information on an as-needed basis—e.g., during acts in accordance with blocks 110 and 310. One benefit of this approach is that a separate image does not need to be kept in storage. In the remainder of this discussion, spatial image 225 will be discussed as if it were an image separate and distinct from input image 205. It should be kept in mind, however, that this is primarily for expository purposes and may, or may not, physically exist in a physical implementation.

As an aside, the process outlined in FIGS. 2 and 3 may be considered a general case of generating a standard luma histogram. For instance, if spatial image 225 was in fact a copy of input luma image 205, then acts in accordance with block 115 and FIGS. 2 and 3 could result in a standard luma histogram when the composition function is restricted to a sum operator. The added flexibility in permitting factors other than pure luminance to effect the generated tone curve is a powerful and unexpected aspect of the techniques disclosed herein.

Returning to FIG. 1, once generated, content-load histogram may be normalized and moderated (block 120). As used here, the term "normalized" means the content-load histogram generated in accordance with block 115 may be adjusted so that the sum of its bins is equal to approximately one (1). As used here, the term "moderated" means to suppress or dampen large peaks. Consider, for example, the case where a large portion of the information encoded in a spatial image corresponds to only a few gray levels. In this case, content-load histogram may exhibit large peaks. When this occurs, it is possible for these peaks to dominate the tone mapping process. It has been found beneficial therefore, to moderate or dampen the normalized content-load histogram. In one embodiment, actions in accordance with block 120 may be expressed as follows:

$$h[i] = \frac{H[i]^a}{\sum_{j=0}^{n-1} H[j]^a}, \quad 0 < a < 1, \qquad \text{EQ. 2}$$

where h[i] represents the i-th bin of the normalized and moderated content-load histogram, H[i] represents the i-th bin of the content-load histogram in accordance with block 115, 'a' represents a dampening factor, 'n' represents the number of bins in the content-load histogram, and the summation value represents a normalizing parameter. The factor a may be chosen to provide the desired stability and may, in general, be determined empirically.

Both system noise (block 125) and quantization noise (block 130) may be obtained and represented by a table or array with one element for each gray level or each gray level range. System or camera noise (represented as $N_s$) is typically a function of the type of image sensor and the particular image capture parameters used during image capture (e.g., exposure and gain settings). System noise may includes dark noise and shot noise. Quantization noise (represented as $N_q$) is typically a function of the image processing pipeline that takes the sensor's output and delivers the image or images being processed (e.g., luma image 200). When a single image is being processed, quantization noise $N_q$ may be a constant (for that image). When multiple frames having different exposures are being combined or fused, such as during High Dynamic Range (HDR) or wide area-of-view image generation, the quantization error for each gray level must be estimated from both the original quantization error and the fusing weights for each exposure.

With normalized content-load histogram h, system noise table $N_s$, and quantization noise $N_q$ tables known, the signal-to-noise ratio for each gray level may be expressed as follows:

$$SNR[i] = \frac{i}{\max(N_s[i], N_q[i])},\qquad \text{EQ. 3}$$

where SNR[i] represents the signal-to-noise ratio at the i-th gray level, max( ) represents the algebraic maximum function, and 'i' runs from 0 to (n−1). See discussion above.

From EQ. 3, an upper-bound to the tone curve's slope at output gray level 'i' may be expressed as follows (block 135):

$$S_{max}[i] = \frac{SNR[i]}{T_{SNR}},\qquad \text{EQ. 4}$$

where $T_{SNR}$ represents the minimum allowed target signal-to-noise ratio (typically a tuning parameter that may be adjusted to suit the needs of the developer's particular implementation). In general, the larger the $T_{SNR}$ value, the less tolerant the resulting tone curve will be to noise. It may be recognized that in conventional histogram equalization, the slope at the i-th gray level is proportional to the luma histogram count at that level. In contrast, operation 100 (and, more specifically, block 135) constrains the maximum slope at any given gray level by incorporating the effect of noise.

Figure 4A:
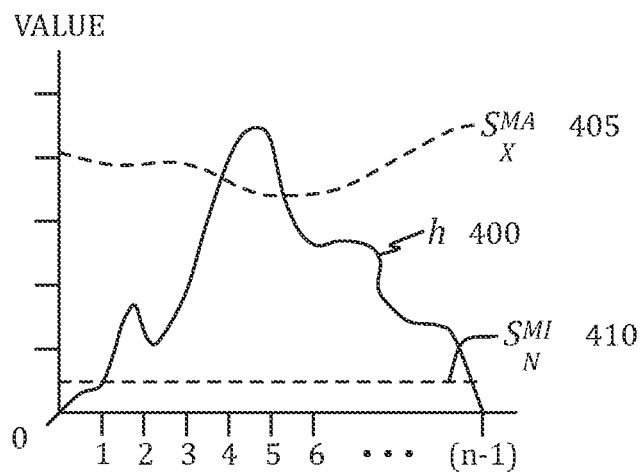
FIGS. 4A-4D show various incarnations of a content-load histogram and the resultant tone curve in accordance with one embodiment.

When an input image has no, or very few, pixels at some gray levels (e.g., a snow scene without any dark objects), it is usually desirable to not allocate as many output gray levels to these input gray levels. It is also not desirable, however, to eliminate these gray levels altogether from the output image. Doing so could cause gradient areas in the output image to become unnatural, or overly exaggerate contrast at the dominant gray levels. It has been found that to avoid eliminating an input image's zero or low use gray levels during the tone mapping process, a lower-bound to the tone curve's slope may be set (block 140). While this lower-bound may be set arbitrarily, there is usually no need for it to be higher than one quantization level for a single exposure image or, in the case of a multi-exposure fused HDR image, higher than the estimated quantization step size. In another embodiment, lower-bound slope may be a function of the gray level. FIG. 4A shows normalized content-load histogram h 400 (generated in accordance with, for example, EQ. 2) with exemplar upper- and lower-bound slope limits $S_{MAX}$ 405 and $S_{MIN}$ 410 respectively.

Figure 4B:
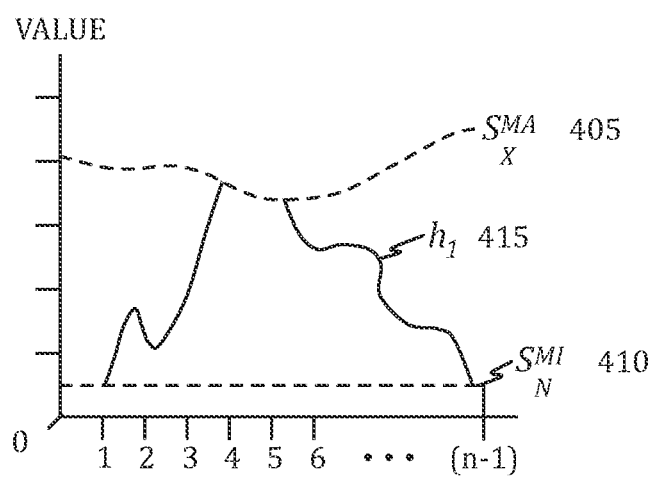
Figure 4C:
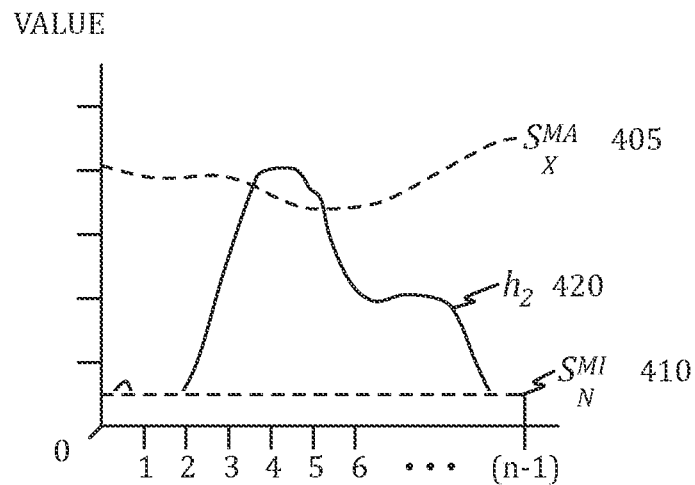

Referring to FIGS. 1, 4B and 4C, upper-and lower-bound slopes $S_{MAX}$ 405 and $S_{MIN}$ 410 may be enforced by clipping content-load histogram h 400 to generate histogram $h_1$ 415 (FIG. 4B), and then renormalizing to create histogram $h_2$ 420 (block 145, FIG. 4C). Formalistically, acts in accordance with block 145 may be expressed as follows:

$$h[i]=\max(S_{MIN},\min(S_{MAX}[i],h[i]))\qquad \text{EQ. 5}$$

to clip, and $$h[i] = \frac{h[i]}{\sum_{j=0}^{n-1} h[j]}\qquad \text{EQ. 6}$$

to renormalize. Here h[i], $S_{MAX}[i]$, $S_{MIN}$, and max( ) are as discussed above while min ( ) represents the algebraic minimum function.

Figure 4D:
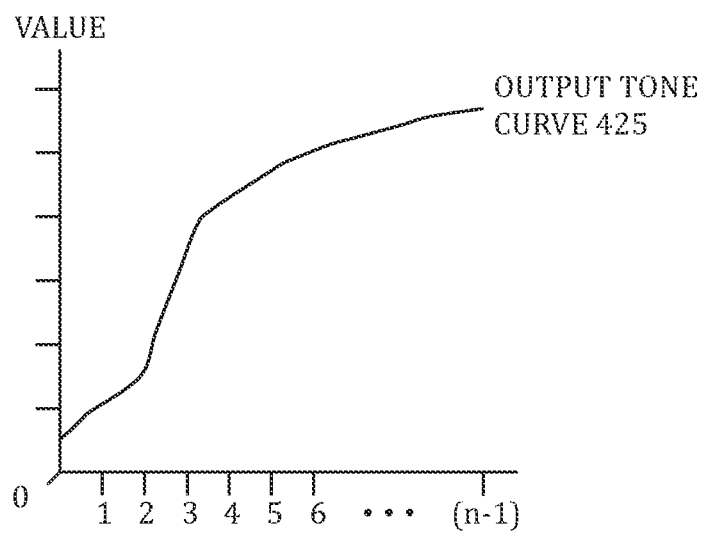

As shown in FIG. 4C, after renormalization the resulting content-load histogram (e.g., $h_2$ 420) may once again exceed upper-and/or lower-bound slopes $S_{MAX}$ 405 and $S_{MIN}$ 410. When this occurs (the "NO" prong of block 150), actions in accordance with block 145 may be repeated. In practice, it has been found that five (5) iterations though blocks 145-150 are generally sufficient to generate a normalized histogram that remains largely within the bounds set by $S_{MAX}$ and $S_{MIN}$. In one embodiment, anytime the renormalized content-load histogram exceeds either $S_{MAX}$ 405 and $S_{MIN}$ 410, operations in accordance with block 145 may be repeated. In another embodiment, some degree of overflow may be tolerated. In these embodiments, as long as the renormalized content-load histogram is substantially between upper-and lower-bound slopes $S_{MAX}$ 405 and $S_{MIN}$ 410, testing in accordance with block 150 may be satisfied. The amount of overflow that may be tolerated may be dependent on the precision of control required by the target application. In one implementation, for example, an overflow at the upper-bound of less than 5% of the total area under the histogram may be tolerated while the lower-bound (zero underflow) may be strictly enforced. Referring to FIG. 4D, if the clipped and normalized content-load histogram remains substantially within the limits set by $S_{MAX}$ and $S_{MIN}$ (the "YES" prong of block 150), it may be used to generate output tone curve 425 (block 155). In practice, tone curve 425 in accordance with block 155 represents a cumulative distribution of the clipped and normalized content-load histogram:

$$T[i] = \sum_{j=\{0:i\}} h[j],\qquad \text{EQ. 7}$$

where T[i] represents the value of the i-th tone curve element/value.

Figure 5A:
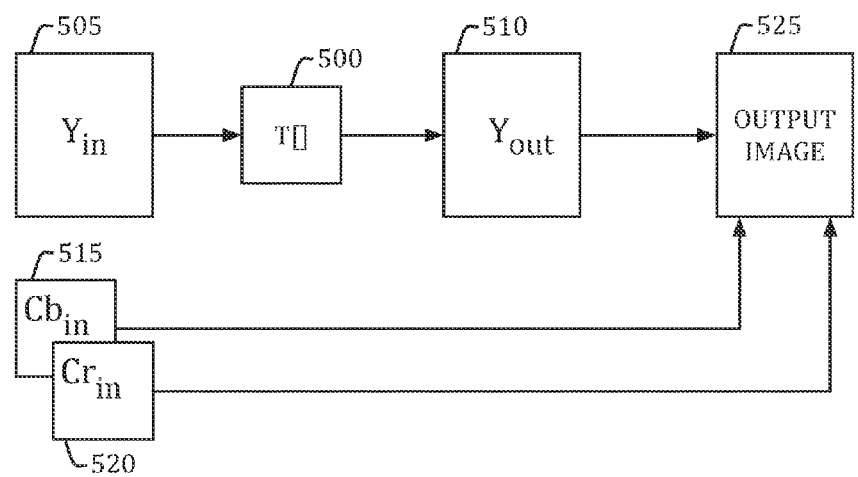
FIGS. 5A and 5B show two illustrative means to use a tone curve generated in accordance with this disclosure to generate an output image.
Figure 5B:
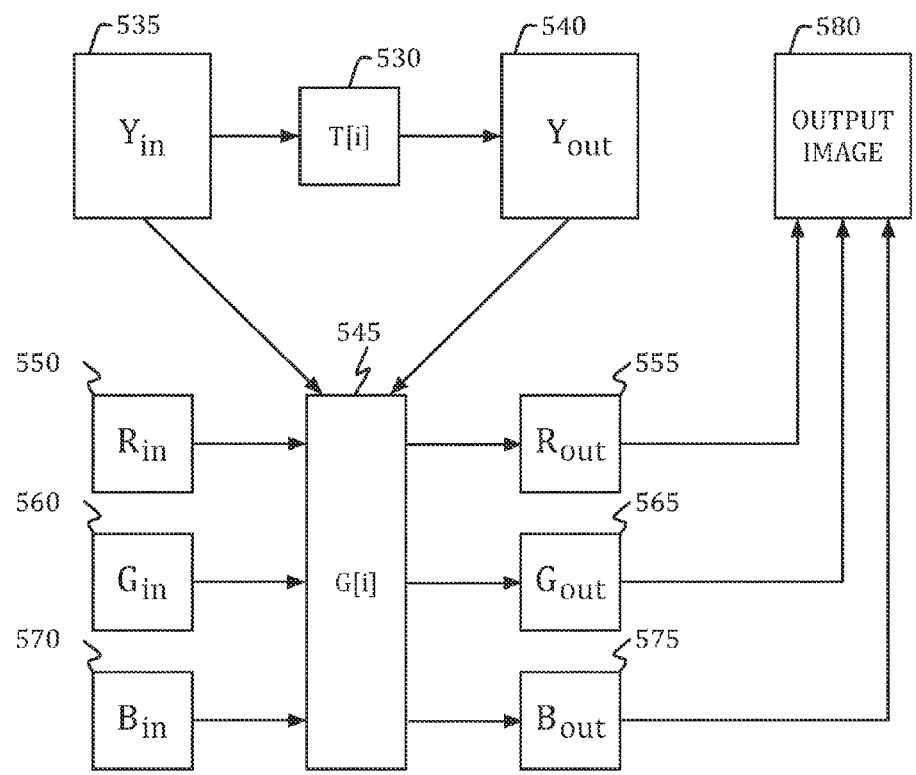

Tone curve T[ ] may be used in a number of ways to generate an output image. Referring to FIG. 5A, in a YCbCr colorspace, tone curve 500 in accordance with EQ. 7 may be used to directly convert input luma image 505 into output luma image 510, with Cb 515 and Cr 520 data being copied directly to output image 525. Referring to FIG. 5B, in a RGB colorspace, tone curve 530 in accordance with EQ. 7 may be used to covert input luma image 535 into output luma image 540. On a pixel-by-pixel basis, gain factor 545 may be applied to input red (R) channel 550 to generate output red channel 555, to input green (G) channel 560 to generate output green channel 565, and input blue (B) channel 570 to generate output blue channel 575. Output channels 555, 565 and 575 may then be combined to generate output image 580. In one embodiment, gain factor 545 may be determined as follows:

$$G[i] = \frac{Y_{out}[i]}{Y_{in}[i]}, \quad \text{EQ. 8}$$

where G[i] represents the gain factor at the i-th pixel position, $Y_{in}[i]$ represents the input luminance image 535 value at the i-th pixel position, and $Y_{out}[i]$ represents the output luminance image 540 value at the i-th pixel position.

While the above describes how to create and use an adaptive global tone curve, the approach set-forth in operation 100 may also be used to provide adaptive local tone curves. In one embodiment, a content-load histogram may be generated for every pixel, with each histogram used to create a corresponding tone curve. In another embodiment, a content-load histogram may be generated for a subset of the image pixels and a tone curve generated for each histogram. In all embodiments disclosed herein, and unlike prior art region-based tones curves, every pixel in an image may contribute to every tone curve. Allowing each pixel to have an influence on each content-load histogram/tone curve has provided unexpectedly good results vis a vis output image quality.

Figure 6:
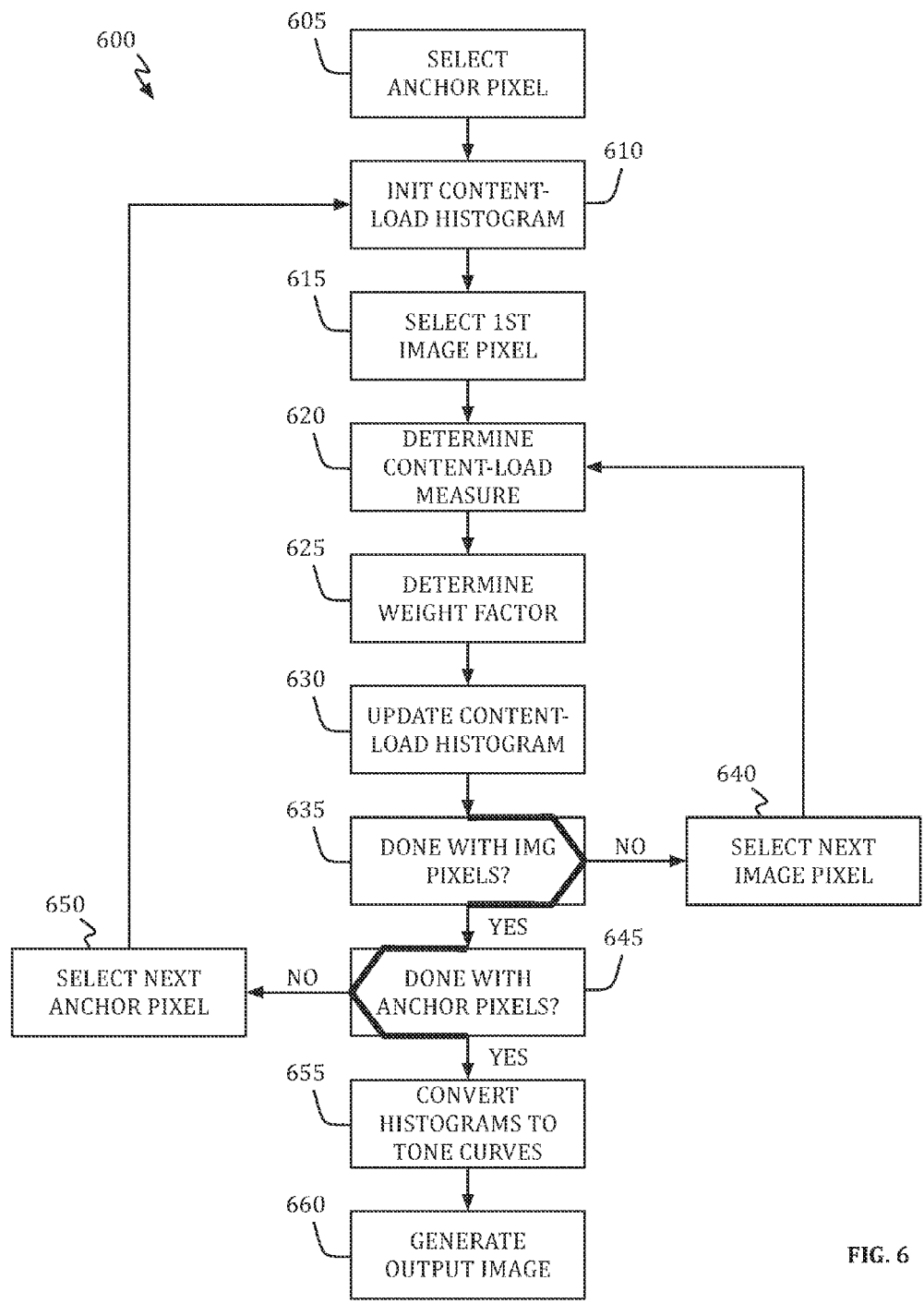
FIG. 6 shows, in flowchart form, an adaptive noise-constrained tone curve generation operation in accordance with another embodiment.

Referring to FIG. 6, local noise-constrained tone curve operation 600 in accordance with one embodiment may be used to construct a content-load histogram-backed tone curve for each of a designated number of pixels in an image. To begin, a first anchor pixel may be chosen (block 605). In one embodiment, a single anchor pixel may be chosen for an entire image. In another embodiment, every pixel in an image may be designated as an anchor pixel. In yet another embodiment, a specified subset of an image's pixels may be designated as anchor pixels and a tone curve generated for each anchor pixel.

Next, a content-load histogram for the selected anchor pixel may be initialized (block 610), a "first" pixel from the image selected (block 615), and a content-load measure determined as described above (block 620). A weight factor may then be determined based on a specified relationship between the current anchor pixel and the selected image pixel (block 625). In general, this specified relationship may be linear or non-linear. In one embodiment, the specified relationship may be a Gaussian distribution of the distance between the anchor pixel and the currently selected image pixel. (For a particular example, see the discussion below in connection with FIGS. 7 and 8.) In general, weight factors determined in accordance with block 625 may be values between 0 and 1. The weight factor may then be applied to the content-load measure (e.g., multiplied), and the resulting value used to update the content-load histogram (block 630). Once the currently selected image pixel has been processed, a check may be made to determine if all pixels in the image have been processed for the current anchor pixel (block 635). If additional pixels remain to be processed in accordance with blocks 620-630 (the "NO" prong of block 635), a next pixel may be selected (block 640), where after operation 600 continues at block 620. If all of the image's pixels have been examined for their contribution to the currently selected anchor pixel's content-load histogram (the "YES" prong of block 635), a further check may be made to determine if all of the desired anchor pixels have been processed (block 645). If they have not (the "NO" prong of block 645), the next anchor pixel may be identified and selected (block 650), where after operation 600 continues at block 610. If all anchor pixels have been processed (the "YES" prong of block 645), each of the generated content-load histograms may be converted into a local noise-constrained tone curve as described above with respect to FIGS. 1-4 (block 655). The collection of tone curves (possibly one for each image pixel), may be used to generate an output image as discussed more fully below (block 660).

Figure 7:
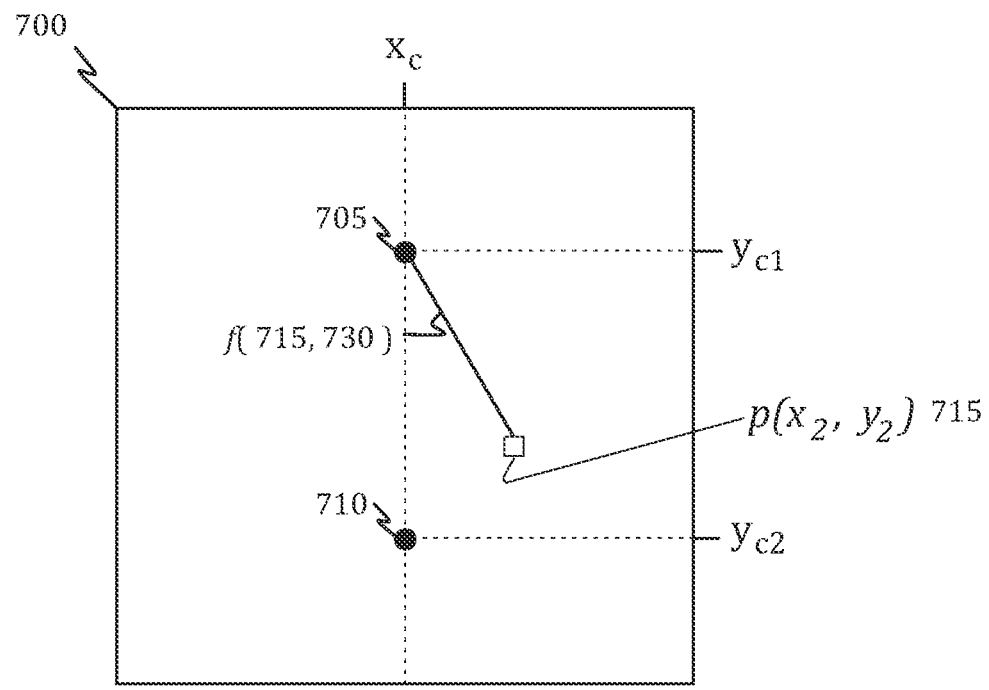
FIG. 7 shows an illustrative image with two anchor pixels in accordance with one embodiment.
Figure 8:
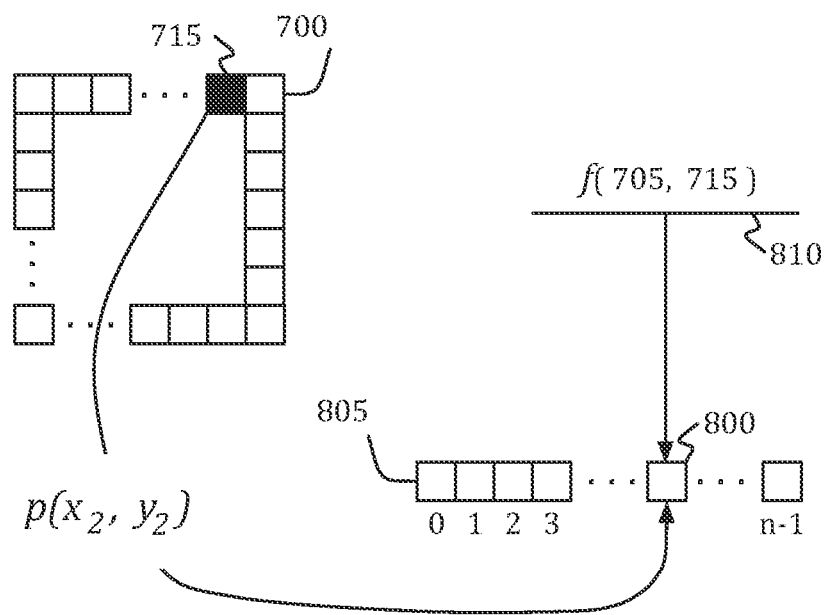
FIG. 8 illustrates a content-load histogram update operation in accordance with another embodiment.

By way of example, consider the special-case embodiment illustrated in FIGS. 7 and 8. There, the spatial image (e.g., image 225 from FIG. 2) is taken to be the input image itself. As shown in FIGS. 7 and 8, two anchor pixels have been chosen in input luma image 700. First anchor pixel 705 may be located at $(x_c, y_{c1})$ Second anchor pixel 710 may be located at $(x_c, y_{c2})$. An additional pixel, 715, has been identified at location $(x_2, y_2)$ and whose value may be designated as $p(x_2, y_2)$. Now consider determining the weight or influence pixel 715 has on anchor pixel 705 in accordance with blocks 620-630 of FIG. 6. First, the value of pixel 715—$p(x_2, y_2)$—may used to identify bin 800 in anchor pixel 705's content load histogram 805. Content-load histogram bin 800 may then be updated based on some functional relationship between anchor pixel 705 and pixel 715 (e.g., functional relationship 810).

In general, functional relationship 810 may be whatever a particular implementation needs and, as noted above, may be linear or non-linear. In one embodiment, functional relationship 810 may be a Gaussian distribution of the distance between an anchor pixel (e.g., pixel 705) and a pixel being evaluated (e.g., pixel 715). For example, this relationship may be expressed as follows:

$$f((x_a, y_a), (x_1, y_1)) = \exp\left(\frac{-d}{\sigma^2}\right), \quad \text{EQ. 9}$$

where $(x_a, y_a)$ represents the x and y coordinates of a first anchor pixel, $(x_1, y_1)$ represents the x and y coordinates of a pixel from the input image being evaluated, f( ) represents a functional relationship between the pixels at $(x_a, y_a)$ and $(x_1, y_1)$, exp( ) represents the exponential function, 'd' represents a distance measure between the pixels at $(x_a, y_a)$ and $(x_1, y_1)$, and 'σ' represents the spread of the Gaussian distribution about the anchor pixel at $(x_a, y_a)$. In general, distance measure d may represent any metric that makes sense for the particular implementation; not just distance. Because images are composed of pixels that are generally arranged in a rectangular array however, it is convenient to think of d as a distance metric. One example distance measure is a Euclidean distance that may be represented as:

$$d = (x_a - x_1)^2 + (y_a - y_1)^2, \quad \text{EQ. 10}$$

where $(x_a, y_a)$ and $(x_1, y_1)$ are as described above.

For the example distribution of EQ. 9, σ represents the spread of the Gaussian distribution about the anchor pixel located at $(x_a, y_a)$. It can be seen that as σ increases, the spread of the modeled distribution increases which, in turn, gives pixels distal to the anchor pixel at $(x_a, y_a)$ more influence on the generated values (compared to a smaller σ). Likewise, as σ decreases, the spread of the modeled distribution decreases which, in turn, gives pixels distal to the anchor pixel less influence on the generated values (compared to a larger σ). In one embodiment, a threshold may be applied to the output of the selected functional relationship so that any value below a certain threshold may return a zero and thus, pixels greater than a certain distance from the anchor pixel have no influence on it's histogram. In another embodiment, a floor and/or ceiling function may be applied to the output of the selected functional relationship. Once a anchor pixel's content-load histogram has been determined (e.g., in accordance with FIG. 6), the corresponding local tone curve may be generated as described above with respect to blocks 155 in FIG. 1 and 645 in FIG. 6, Output image generation in accordance with block 660 in FIG. 6 proceeds a little differently from that described above with respect to FIG. 5. This is because the different local tone curves should generally be combined in a fashion that does not introduce abrupt changes, as such changes may generate unwanted visual artifacts in the output image. In one embodiment, the ultimate output pixel value may be the weighted sum of the output from each local tone curve. One example of this may be expressed as follows:

$$p_{out}(x_1, y_1) = \frac{\omega_1 T_1[p_{in}(x_1, y_1)] + \omega_2 T_2[p_{in}(x_1, y_1)] + \cdots + \omega_M T_M[p_{in}(x_1, y_1)]}{\sum_{i=1}^{M} \omega_i},$$  EQ. 11 where $p_{out}(x_1, x_1)$ represents the value for the pixel located at $(x_1, x_1)$ in the output image, $\omega$ represents weighting factors for each local tone curve, $p_{in}(x_1, x_1)$ represents the value for the pixel located at $(x_1, x_1)$ in the input image, T represents the local tone curve operator such that $T_i(x_1, x_1)$ represents output from the i-th local tone curve corresponding to the value of the input image's pixel located at $(x_1, x_1)$, and 'M' represents the number of local tone curves. It will be recognized that the summation in the denominator of EQ. 11 represents a normalization factor.

With respect to weighting factor $\omega_i$, values may be found by looking at some functional relationship (e.g., distance) between $p_{out}(x_1, x_1)$ and each of the pixels for which tone curves have been generated (two in FIG. 7). In one embodiment, a Gaussian weighting function may be used. It has been found that one weighting function (e.g., Gaussian) may be used when generating content-load histograms in accordance with FIG. 6, and another weighting function (e.g., 1/d) when interpolating among the different tone curves in accordance with EQ. 11. For example, if it was know that a face appears in certain areas of the image, those areas could be treated differently by altering the weighting functions used to determine $\omega_i$, when evaluating image pixels from those areas. With the output image pixel value known (e.g., in accordance with EQ. 11), output image generation may proceed as described above in FIG. 5. Accordingly, in one embodiment output in accordance with EQ. 11 may "stand-in" for the output of element 510 (in FIG. 5A) or 540 (in FIG. 5B).

Figure 9:
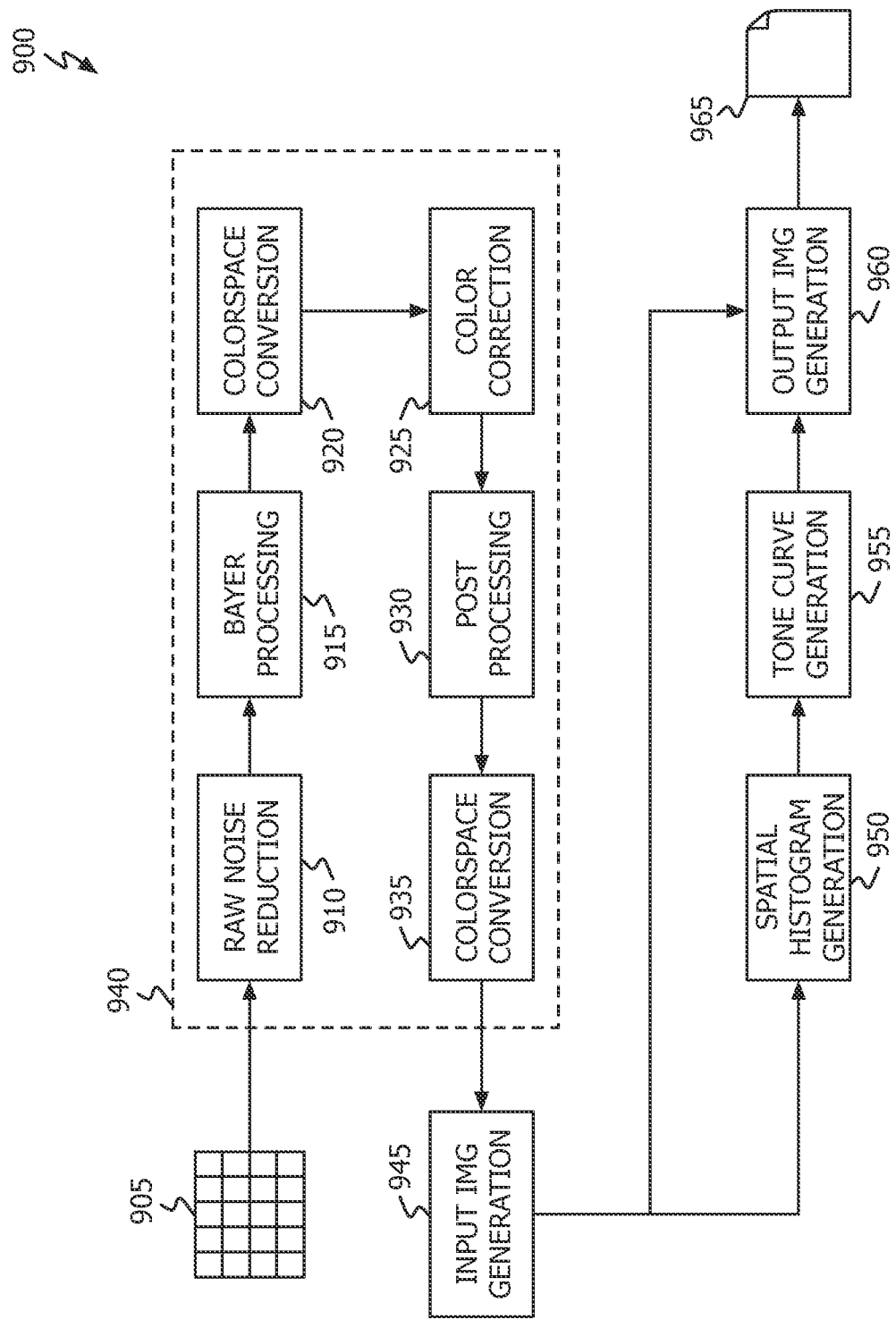
FIG. 9 shows, in block diagram form, an image processing pipeline in accordance with one embodiment.

Referring to FIG. 9, in one embodiment image processing system 900 may include image sensor 905, processing units 910-935 (collectively referred to as raw image processing pipeline 940), image input generation unit 945, and output image generation units 950-960. By way of example, image sensor 905 may be a charge-coupled device (CCD) or a complementary metal-oxide semiconductor (CMOS) sensor. Illustrative raw image processing pipeline 940 includes raw noise reduction unit 910 (to compensate for intrinsic image sensor noise), Bayer processing unit 915 (to perform Bayer Interpolation or "de-mosaicing operations), colorspace conversion unit 920 (to convert the image's colorspace from that of the image sensor to one in which additional processing is more convenient), post processing unit 930 (to, for example perform a white balance operation), and second colorspace conversion unit 935 (to convert the image to a colorspace appropriate for application-level operations). The image provided by pipeline 940 may, for example, be in a YCbCr or RGB colorspace. In one embodiment, raw image processing pipeline 940 may be implemented directly in hardware (e.g., as an application specific integrated circuit) or as software executed by one or more general purpose processors alone or in combination with one or more special purpose processors (e.g., graphics processing units). In another embodiment, raw image processing pipeline 940 may be implemented in part by hardware and in part by software (e.g., firmware). One purpose of input image generation unit 945 is to provide an image suitable for processing in accordance with this disclosure. In one embodiment, input image generation unit 945 may produce an image in YCbCr format, the Y-channel of which may be used by processing units 950-960. In another embodiment, input image generation unit 945 may generate an image that is itself a combination of multiple images such as may be generated during HDR or panoramic registration operations.

In one embodiment histogram generation unit 950 produces a content-load histogram in accordance with FIGS. 1-4. In another embodiment, histogram generation unit 950 generates multiple local histograms in accordance with FIGS. 4 and 6. Tone curve generation unit 955 may produce a tone curve (global or local) as disclosed herein. Similarly, output image generation unit 960 may produce output image 965 in accordance with FIG. 5. In the end, output image 965 may be an image whose color correction operation takes into account the noise present in the image capture process. Processing units 945-960 may be implemented in hardware, software, or a combination of both (see discussion above regarding raw image processing pipeline 940).

Figure 10:
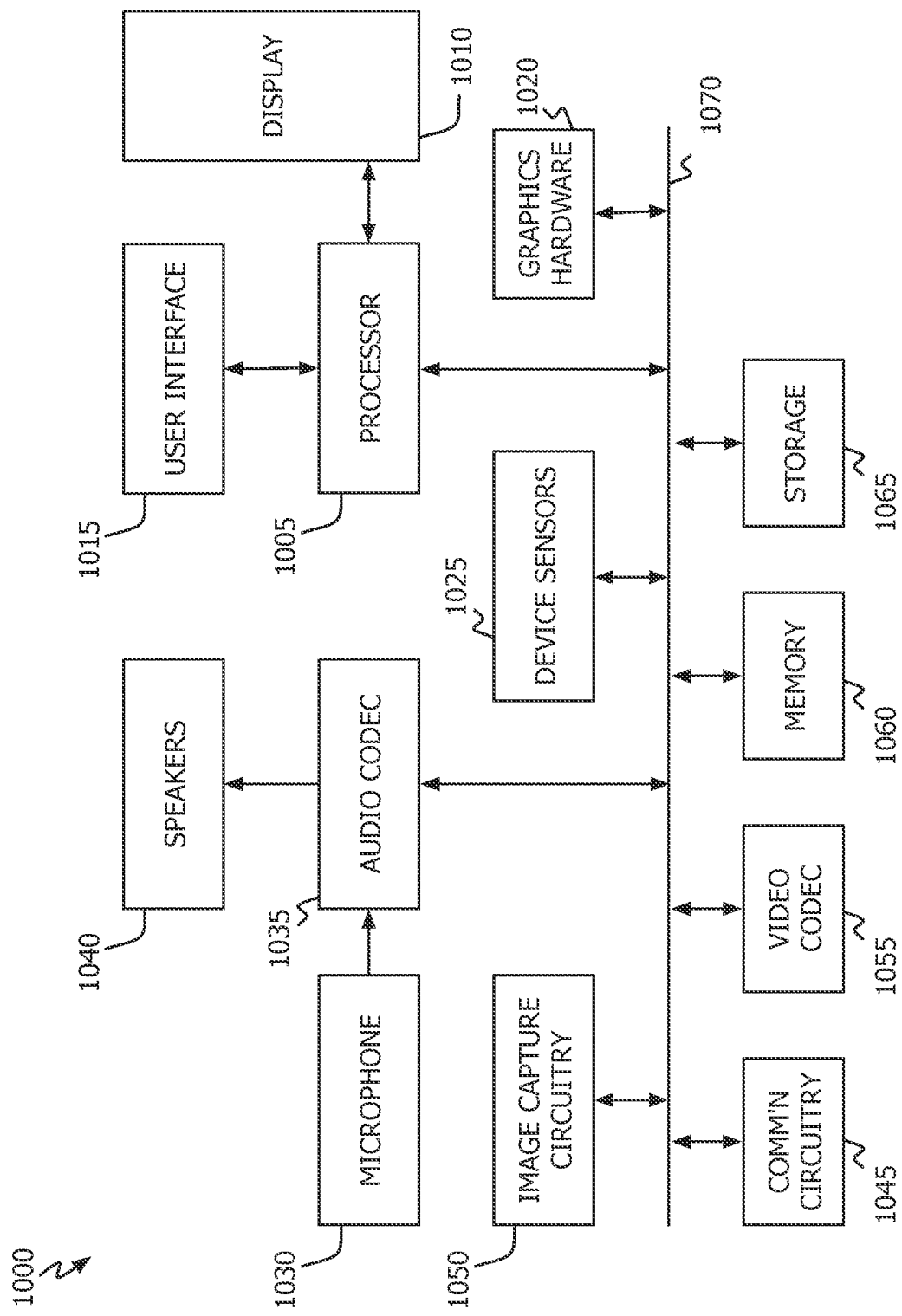
FIG. 10 shows, in block diagram form, an electronic device in accordance with one embodiment.

Referring to FIG. 10, a simplified functional block diagram of illustrative electronic device 1000 is shown according to one embodiment. Electronic device 1000 may include processor 1005, display 1010, user interface 1015, graphics hardware 1020, device sensors 1025 (e.g., proximity sensor/ambient light sensor, accelerometer and/or gyroscope), microphone 1030, audio codec(s) 1035, speaker(s) 1040, communications circuitry 1045, digital image capture unit 1050, video codec(s) 1055, memory 1060, storage 1065, and communications bus 1070. Electronic device 1000 may be, for example, a personal digital assistant (PDA), personal music player, a mobile telephone, or a notebook, laptop or tablet computer system.

Processor 1005 may execute instructions necessary to carry out or control the operation of many functions performed by device 1000 (e.g., such as the generation and/or processing of images in accordance with operations 100 and 600). Processor 1005 may, for instance, drive display 1010 and receive user input from user interface 1015. User interface 1015 can take a variety of forms, such as a button, keypad, dial, a click wheel, keyboard, display screen and/or a touch screen. Processor 1005 may be a system-on-chip such as those found in mobile devices and include a dedicated graphics processing unit (GPU). Processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 process graphics information. In one embodiment, graphics hardware 1020 may include a programmable graphics processing unit (GPU).

Sensor and camera circuitry 1050 may capture still and video images that may be processed to generate images in accordance with this disclosure and may, for example, incorporate raw image processing pipeline 940. Output from camera circuitry 1050 may be processed, at least in part, by video codec(s) 1055 and/or processor 1005 and/or graphics hardware 1020, and/or a dedicated image processing unit incorporated within circuitry 1050. Images so captured may be stored in memory 1060 and/or storage 1065. Memory 1060 may include one or more different types of media used by processor 1005, graphics hardware 1020, and image capture circuitry 1050 to perform device functions. For example, memory 1060 may include memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1060 and storage 1065 may be used to retain computer program instructions or code organized into one or more modules and written in any desired computer programming language. When executed by, for example, processor 1005 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
   obtain, from an image capture device, a first image comprising pixels wherein each pixel has a value;
   select one or more anchor pixels;
   select, for each of the one or more anchor pixels, every pixel in the first image one at a time, and with each selected pixel—
      identify a bin within a content-load histogram based, at least in part, on the value of the selected pixel, wherein a content-load histogram comprises a histogram in which each bin identifier corresponds to a value each pixel in the first image may assume, and whose bin values represent an amount of a specified structural information carried by the first image's pixels at a bin's corresponding bin identifier,
      determine a content-load value corresponding to the selected pixel,
      determine a weight factor for the selected pixel based, at least in part, on the selected pixel and the selected anchor pixel,
      update the identified content-load histogram bin based, at least in part, on the content-load value and the weight factor;
   adjust the content-load histogram based, at least in part, on noise characteristics of the image capture device;
   generate a tone curve based, at least in part, on the adjusted content load histogram; and
   generate an output image based, at least in part, on the tone curve.

2. The non-transitory program storage device of claim 1, wherein the instructions to cause the processor to obtain a first image comprise instructions to cause the processor to obtain a first luminance image.

3. The non-transitory program storage device of claim 1, wherein the instructions to cause the processor to select an anchor pixel comprise instructions to cause the processor to select each pixel, one at a time, as an anchor pixel.

4. The non-transitory program storage device of claim 1, wherein the instructions to cause the processor to determine a content-load value comprise instructions to cause the processor to determine a dynamic range value in a region around the selected pixel.

5. The non-transitory program storage device of claim 4, wherein the instructions to cause the processor to determine a dynamic range value comprise instructions to cause the processor to calculate a dynamic range value in real-time.

6. The non-transitory program storage device of claim 1, wherein the instructions to cause the processor to determine a content-load value comprise instructions to cause the processor to:
   identify a second image comprising the same number of pixels as the first image, wherein each pixel in the second image has a value and corresponds to one pixel in the first image; and
   select that pixel in the second image corresponding to the selected pixel from the first image, wherein the value of the pixel selected from the second image comprises the content-load value.

7. The non-transitory program storage device of claim 1, wherein the instructions to cause the processor to determine a weight factor comprise instructions to cause the processor to:
   determine a distance measure value between the selected pixel and the selected anchor pixel; and
   determine a weight factor based, at least in part, on the distance measure value.

8. The non-transitory program storage device of claim 7, wherein the instructions to cause the processor to determine a distance measure value comprise instructions to cause the processor to determine a Euclidean distance between the selected pixel and the selected anchor pixel.

9. The non-transitory program storage device of claim 8, wherein the instructions to cause the processor to determine a weight factor comprise instructions to cause the processor to apply the distance measure value to a Gaussian distribution.

10. The non-transitory program storage device of claim 1, wherein the instructions to cause the processor to update the identified content-load histogram bin comprise instructions to cause the processor to apply the determined weight factor to the content-load value to generate an update value.

11. The non-transitory program storage device of claim 10, wherein the instructions to cause the processor to apply the determined weight factor to the content-load value comprise instructions to cause the processor to multiply the weight factor and the content-load value.

12. The non-transitory program storage device of claim 10, wherein the instructions to cause the processor to update the identified content-load histogram bin comprise instructions to cause the processor to add the update value to the identified content-load histogram bin.

13. The non-transitory program storage device of claim 1, wherein the instructions to cause the processor to adjust the content-load histogram comprise instructions to cause the processor to:
- obtain noise characteristics for the image capture device;
- determine one or more of a maximum value and a minimum value for the content-load histogram based, at least in part, on the noise characteristics;
- limit values in the content-load histogram in accordance with the one or more of a maximum value and a minimum value to generate a second content-load histogram; and
- normalize the second content-load histogram to generate an adjusted content-load histogram.

14. The non-transitory program storage device of claim 13, wherein the instructions to cause the processor to limit and normalize are repeated a plurality of times.

15. The non-transitory program storage device of claim 13, wherein the instructions to cause the processor to determine one or more of a maximum value and a minimum value comprise instructions to cause the processor to set a minimum value equal to 1 quantization noise error level.

16. A method to generate an image using a noise-constrained tone curve, comprising:
- obtaining, from an image capture device, a first image comprising pixels wherein each pixel has a value;
- identifying a bin within a content-load histogram based, at least in part, on the value of the selected pixel, wherein a content-load histogram comprises a histogram in which each bin identifier corresponds to a value each pixel in the first image may assume, and whose bin values represent an amount of a specified structural information carried by the first image's pixels at a bin's corresponding bin identifier,
- determining a content-load value corresponding to the selected pixel,
- determining a weight factor for the selected pixel based, at least in part, on the selected pixel and the selected anchor pixel,
- updating the identified content-load histogram bin based, at least in part, on the content-load value and the weight factor;
- adjusting the content-load histogram based, at least in part, on noise characteristics of the image capture device;
- generating a tone curve based, at least in part, on the adjusted content-load histogram; and
- generating an output image based, at least in part, on the tone curve.

17. The method of claim 16, wherein selecting an anchor pixel comprises selecting each pixel, one at a time, as an anchor pixel.

18. The method of claim 16, wherein determining a content-load value comprises determining a dynamic range value in a region around the selected pixel.

19. The method of claim 16, wherein determining a content-load value comprises:
- identifying a second image comprising the same number of pixels as the first image, wherein each pixel in the second image has a value and corresponds to one pixel in the first image; and
- selecting that pixel in the second image corresponding to the selected pixel from the first image, wherein the value of the pixel selected from the second image comprises the content-load value.

20. The method of claim 16, wherein determining a weight factor comprises:
- determining a distance measure value between the selected pixel and the selected anchor pixel; and
- determining a weight factor based, at least in part, on the distance measure value.

21. The method of claim 20, wherein determining a distance measure value comprises determining a Euclidean distance between the selected pixel and the selected anchor pixel.

22. The method of claim 21, wherein determining a weight factor comprises applying the distance measure value to a Gaussian distribution.

23. The method of claim 16, wherein updating the identified content-load histogram bin comprises applying the determined weight factor to the content-load value to generate an update value.

24. The method of claim 23, wherein applying the determined weight factor to the content-load value comprises multiplying the weight factor and the content-load value.

25. The method of claim 16, wherein adjusting the content-load histogram comprises:
- obtaining noise characteristics for the image capture device;
- determining one or more of a maximum value and a minimum value for the content-load histogram based, at least in part, on the noise characteristics;
- limiting values in the content-load histogram in accordance with the one or more of a maximum value and a minimum value to generate a second content-load histogram; and
- normalizing the second content-load histogram to generate an adjusted content-load histogram.

26. The method of claim 25, wherein limiting and normalizing are repeated a plurality of times.

27. A non-transitory program storage device, readable by a processor and comprising instructions stored thereon to cause the processor to:
- obtain, from an image capture device, a first image comprising a first plurality of pixels, wherein each pixel has a value;
- for each of the first plurality of pixels—
  - select a pixel, wherein the pixel identifies a bin in a histogram, and
  - update the identified bin based, at least in part, on the value of the pixel;
- obtain noise characteristics of the image capture device;
- constrain maximum and minimum values of the histogram based, at least in part, on the noise characteristics;
- normalize the histogram following application of the constraints based on the image capture device's noise characteristics;
- generate a tone curve based, at least in part, on the constrained and normalized histogram; and
- generate an output image based, at least in part, on the tone curve.

28. The non-transitory program storage device of claim 27, wherein the instructions to cause the processor to constrain maximum and minimum values of the histogram comprise instructions to establish a maximum histogram value that is based, at least in part, on noise quantization of the image capture device.

29. The non-transitory program storage device of claim 28, further comprising instructions to cause the processor to establish a minimum histogram value that is based, at least in part, on a quantization step size determined after a multi-exposure fuse operation.

30. An electronic device, comprising:
- an image capture sensor;

a memory communicatively coupled to the image capture sensor and having stored therein computer program code;
a display element communicatively coupled to the memory; and
one or more processors communicatively coupled to the image capture sensor, the memory, and the display element, the one or more processors adapted to execute the computer program code to:
  obtain, from the memory, a first image comprising pixels wherein each pixel has a value,
  select one or more anchor pixels;
  select, for each of the one or more anchor pixels, every pixel in the first image, one at a time, and with each selected pixel—
    identify a bin within a content-load histogram based, at least in part, on the value of the selected pixel, wherein a content-load histogram comprises a histogram in which each bin identifier corresponds to a value each pixel in the first image may assume, and whose bin values represent an amount of a specified structural information carried by the first image's pixels at a bin's corresponding bin identifier,
    determine a content-load value corresponding to the selected pixel,
    determine a weight factor for the selected pixel base, at least in part, on the selected pixel and the selected anchor pixel, update the identified content-load histogram bin based, at least in part, on the content-load value and the weight factor;
  adjust the content-load histogram based, at least in part, on noise characteristics of the image capture sensor;
  generate a tone curve based, at least in part, on the adjusted content load histogram; and
  store in the memory an output image based, at least in part, on the tone curve.

31. The electronic device of claim 30, wherein the instructions to cause the one or more processors to obtain a first image comprise instructions to cause the one or more processors to obtain a first luminance image from the memory.

32. The electronic device of claim 30, wherein the instructions to cause the one or more processors to select an anchor pixel comprise instructions to cause the one or more processors to select each pixel in the first image, one at a time, as an anchor pixel.

33. The electronic device of claim 30, wherein the instructions to cause the one or more processors to determine a content-load value comprise instructions to cause the one or more processors to determine a dynamic range value in a region around the selected pixel.

34. The electronic device of claim 33, wherein the instructions to cause the one or more processors to determine a dynamic range value comprise instructions to cause the one or more processors to calculate a dynamic range value in real-time.

35. The electronic device of claim 30, wherein the instructions to cause the one or more processors to determine a content-load value comprise instructions to cause the one or more processors to:
  identify a second image comprising the same number of pixels as the first image, wherein each pixel in the second image has a value and corresponds to one pixel in the first image; and
  select that pixel in the second image corresponding to the selected pixel from the first image, wherein the value of the pixel selected from the second image comprises the content-load value.

36. The electronic device of claim 30, wherein the instructions to cause the one or more processors to determine a weight factor comprise instructions to cause the one or more processors to:
  determine a distance measure value between the selected pixel and the selected anchor pixel; and
  determine a weight factor based, at least in part, on the distance measure value.

37. The electronic device of claim 36, wherein the instructions to cause the one or more processors to determine a distance measure value comprise instructions to cause the one or more processors to determine a Euclidean distance between the selected pixel and the selected anchor pixel.

38. The electronic device of claim 37, wherein the instructions to cause the one or more processors to determine a weight factor comprise instructions to cause the one or more processors to apply the distance measure value to a Gaussian distribution.

39. The electronic device of claim 30, wherein the instructions to cause the one or more processors to update the identified content-load histogram bin comprise instructions to cause the one or more processors to apply the determined weight factor to the content-load value to generate an update value.

40. The electronic device of claim 39, wherein the instructions to cause the one or more processors to apply the determined weight factor to the content-load value comprise instructions to cause the one or more processors to multiply the weight factor and the content-load value.

41. The electronic device of claim 39, wherein the instructions to cause the one or more processors to update the identified content-load histogram bin comprise instructions to cause the one or more processors to add the update value to the identified content-load histogram bin.

42. The electronic device of claim 30, wherein the instructions to cause the one or more processors to adjust the content-load histogram comprise instructions to cause the one or more processors to:
  obtain noise characteristics for the image capture sensor;
  determine one or more of a maximum value and a minimum value for the content-load histogram based, at least in part, on the noise characteristics;
  limit values in the content-load histogram in accordance with the one or more of a maximum value and a minimum value to generate a second content-load histogram; and
  normalize the second content-load histogram to generate an adjusted content-load histogram.

43. The electronic device of claim 42, wherein the instructions to cause the one or more processors to limit and normalize are repeated a plurality of times.

44. The electronic device of claim 42, wherein the instructions to cause the one or more processors to determine one or more of a maximum value and a minimum value comprise instructions to cause the one or more processors to set a minimum value equal to 1 quantization noise error level.

* * * * *